Oct. 28, 1969          N. OLTENDORF          3,475,669
VARIABLE DYNAMIC DIRECT-CURRENT BRAKE CIRCUIT FOR A.C. MOTOR
Filed Nov. 14, 1967
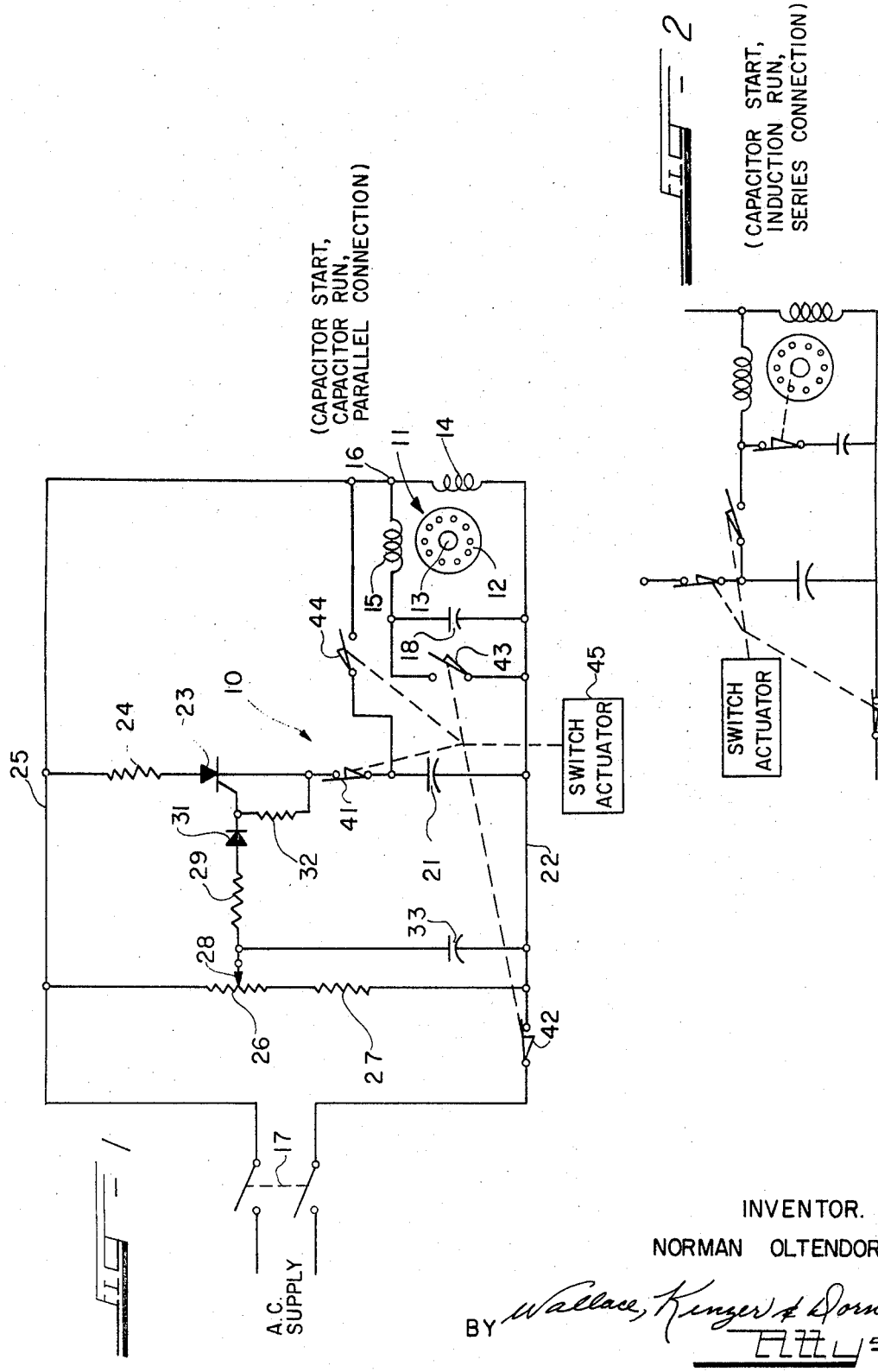
INVENTOR.
NORMAN OLTENDORF United States Patent Office 3,475,669
Patented Oct. 28, 1969

3,475,669
VARIABLE DYNAMIC DIRECT-CURRENT BRAKE CIRCUIT FOR A.C. MOTOR
Norman Oltendorf, Palatine, Ill., assignor to Microdyne, Inc., Rolling Meadows, Ill., a corporation of Illinois
Filed Nov. 14, 1967, Ser. No. 682,817
Int. Cl. H02p 3/24
U.S. Cl. 318—212
7 Claims

ABSTRACT OF THE DISCLOSURE

A variable dynamic direct-current brake circuit for an AC electric motor that permits stopping the motor, under predetermined load, within a preselected time that can be adjusted over a broad range. A relatively large brake storage capacitor is connected in a charging circuit coupled to the AC supply for the motor. The charging circuit provides for adjustment of the maximum charge on the brake capacitor; it includes a signal-controlled rectifier connected in series with the brake capacitor. The rectifier is gated by a phase-shift circuit that may be adjusted to control the firing angle of the rectifier, thus varying the maximum voltage, up to approximately the peak line voltage, to which the brake capacitor can be charged. For braking, the brake capacitor is disconnected from the charging circuit and connected to the motor field windings to afford dynamic direct-current braking, with the braking rate and time determined by the charge on the brake capacitor.

Background of the invention

There are several known methods for electrical braking of alternating current motors. A concise summary of various forms of electrical brakes is set forth in International Rectifier News for February-March 1957 in an article entitled "Direct Current Braking for AC Induction Motors." Known methods include plugging in which electrical power is applied to the motor in reverse phase rotation to develop a reverse torque, dynamic braking in which is resistive load is shunted across the motor terminals, capacitor braking in which capacitors are connected across two or three phases of an induction motor, re-generative braking applied to a motor driven above its synchronous speed, and direct current braking effected by applying a direct current to the field winding of an AC motor. The present invention relates to a new and improved form of direct current braking and is referred to as a variable direct current dynamic brake system.

In direct current braking for alternating current motors, as known heretofore, it has been customary to provide a rectifier circuit that can be connected to two of the motor terminals to supply a direct current to at least a portion of the motor field windings when braking is desired. At the same time, of course, the normal connection of the motor terminals to the AC supply is broken. The rectifiers employed in a circuit of this kind may be required to carry relatively high currents, since the current required for effective braking often exceeds 200% of the motor full load ampere rating. Variation of the braking rate can be achieved, usually by provision of an adjustable auto transformer or some other variable impedance ahead of the rectifiers in the DC circuit. It has also been proposed to utilize a storage capacitor in the brake circuit, instead of a direct rectifier circuit.

In many applications, and particularly for relatively small single phase motors, the cost of a direct rectifier circuit to afford direct current braking is frequently excessive in relation to the cost of the motor itself. On the other hand, capacitor discharge circuits for DC braking, if economically constructed for a single motor size, have afforded no convenient means for adjusting the braking rate of the apparatus. Adjustable capacitors, in the sizes necessary for braking of any motor of reasonable size, are prohibitively expensive. Furthermore, since the peak voltage to which the capacitor may be charged is limited by the AC line voltage available, unless the added expense of a transformer is engendered, it is not practical to construct a single brake circuit that is usable with a variety of different motor sizes. Consequently, direct current braking has seen relatively limited application.

Summary of the invention

It is a primary object of the invention, therefore, to provide a new and improved variable direct current dynamic brake circuit for an alternating current electric motor that affords close and accurate control of the braking rate of the motor.

Another object of the invention is to provide a variable direct current dynamic brake circuit for an alternating current motor that permits adjustment of the braking rate for the motor over a wide range yet is simple and inexpensive in construction and requires no adjustable transformers.

A further object of the invention is to afford a new and improved variable direct current dynamic brake circuit for an alternating current motor that is controlled, in its operation, by a single signal-controlled rectifier that may have a relatively low current and voltage rating.

Another important object of the invention is to provide a new and improved variable direct current dynamic brake circuit for an alternating current motor that may be employed with a variety of different motors of varying characteristics.

Accordingly, the invention relates to a variable direct current dynamic brake circuit for an alternating current electric motor having a rotor and a field winding, the field winding being connectible to an AC supply. The brake circuit comprises a relatively large brake capacitor and a charging circuit connected to the AC supply for the motor and to the brake capacitor, the charging circuit including a signal controlled rectifier. The charging circuit includes adjustable means for varying the conduction angle of the signal-controlled rectifier, thereby adjusting the charge on the brake capacitor. The brake circuit further includes switching means for disconnecting the brake capacitor from the charging circuit, for disconnecting the motor field winding from its AC supply, and for substantially simultaneously connecting the brake capacitor to the field winding to discharge the brake capacitor through the field winding and brake the motor at a rate and within a time determined by the total charge on the brake capacitor.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be made as desired by those skilled in the art without departing from the present invention.

Description of the drawing

FIG. 1 is a schematic circuit diagram of a variable direct current dynamic brake circuit constructed in accordance with one embodiment of the present invention; and FIG. 2 illustrates a modification of the brake circuit of FIG. 1 in accordance with another embodiment of the invention.

Description of the preferred embodiments

FIG. 1 illustrates a variable direct current dynamic brake circuit 10 for the controlled braking of an alternating current electric motor. In FIG. 1, the brake circuit 10 is applied to a single phase capacitor-start capacitor-run motor 11 comprising a conventional squirrel cage rotor 12, mounted upon a motor shaft 13. Motor 11 further includes two field windings, a starting winding 15 and a running winding 14, these two windings being electrically connected to each other at a common terminal 16.

The common terminal 16 of the two field windings for motor 11 is connected to one pole of a single-pole double-throw switch 17 that is connected to a suitable alternating current supply. The other terminal of running winding 14 is connected to the other pole of the starting switch 17. The remaining terminal of the starting winding 15 is connected to a capacitor 18 that is also returned to the second pole of starting switch 17.

Motor 11 is of conventional construction and its operation is conventionally controlled by starting switch 17, which could be replaced by a conventional electrically actuated motor contactor if desired. Closing of switch 17 energizes the two field windings 14 and 15. The currents in the two windings are dephased somewhat with respect to each other due to the presence of the capacitor 18 in the circuit for winding 15. Thus, a rotating electrical field is established by the windings 14 and 15, energizing the squirrel cage rotor 12 and causing the motor to rotate.

The variable direct current dynamic brake circuit 10 in the embodiment of FIG. 1 comprises a relatively large brake capacitor 21. Capacitor 21 is connected in a charging circuit energized from the same AC supply as motor 11. Thus, one terminal of capacitor 21 is connected to the conductor 22 that connects the separate terminals of windings 14 and 15 to starting switch 17. The other terminal of capacitor 21 is connected to the cathode of a signal controlled rectifier 23. The anode of rectifier 23 is connected through a resistor 24 to the AC supply line 25 that connects the motor field winding terminal 16 to starting switch 17.

The charging circuit for brake capacitor 21 further includes an adjustable means for varying the conduction angle of the signal controlled rectifier 23 to adjust the charge on the brake capacitor, as described more fully hereinafter. This adjustable means comprises a potentiometer 26 and a resistor 27 connected in series with each other across the AC supply lines 25 and 22. The tap 28 of potentiometer 26 is connected to the gate electrode of rectifier 23 by a circuit that includes, in series, a resistor 29 and a blocking diode 31. A load resistor 32 is connected between the gate electrode and the cathode of rectifier 23. A capacitor 33 is connected from potentiometer tap 28 to conductor 22 to afford, with potentiometer 26, a phase shift circuit for shifting the phase of the signal supplied to the gate electrode of rectifier 23 relative to the phase of the AC signal in the anode-cathode path of the rectifier.

Brake circuit 10 further includes switching means for control of the braking operation. This switching means comprises four individual switches 41, 42, 43 and 44 all actuated from a single switch actuator mechanism 45. The first switch 41 of this switching means is a normally closed switch that is interposed in the circuit between capacitor 21 and the cathode of rectifier 23. The second switch 42 is interposed in series in the line conductor 22, between starting switch 17 and the operating components of the motor and the brake circuit. The third switch 43 is a normally open switch connected in shunt with the operating capacitor 18 of the motor. The fourth switch 44 is connected from capacitor 21 to the common terminal 16 of the motor field windings.

In considering operation of the variable direct current dynamic brake circuit 10, it may first be assumed that switch 17 has been closed, energizing motor 11. It may further be assumed that the motor 11 is operating under some predetermined load. During the time that motor 11 is running, brake capacitor 21 is charged to a voltage level that is determined by the setting of the brake control potentiometer 26.

The charging level of brake capacitor 21 is determined in accordance with the phase shift of the gate signal supplied to rectifier 23 through the phase shift circuit comprising potentiometer 26 and capacitor 33. Thus, by varying the setting of the potentiometer tap 28, the degree of phase shift effected by the phase shift circuit may be varied from approximately 90° to approximately 170°. With potentiometer 26 adjusted for maximum resistance, by moving tap 28 to the end of the potentiometer adjacent resistor 27, maximum phase shift is obtained and rectifier 23 is fired or rendered conductive near the end of each cycle in which the anode of the rectifier is driven positive with respect to its cathode. On the other hand, movement of tap 28 to the opposite end of the potentiometer to decrease the effective resistance of the phase shift circuit reduces the amount of phase shift so that the rectifier is rendered conductive nearer the 90° point in each cycle, which coincides with the peak of the AC line voltage. With tap 28 of potentiometer moved to the upper end of potentiometer 26 as seen in FIG. 1, the phase shift circuit resistance is at a minimum, the rectifier is fired near the 90° point, and maximum charge is established on capacitor 21.

With the circuit illustrated, assuming a supply voltage of 120 volts, the maximum charge on brake capacitor 21 is near the peak of the line voltage. Typically, the maximum charge may be approximately 165 volts. The minimum charge is much lower. In a typical circuit, again assuming a line voltage of 120 volts, the minimum charge on brake capacitor 21 may be of the order of 25 volts.

For any particular setting of potentiometer 26, brake capacitor 21 is charged to a voltage level that is determined by the firing angle of the signal controlled rectifier 23. A number of cycles of the AC supply may be required to produce a charge on capacitor 21 that corresponds to the voltage level for which the circuit is set. However, once phase voltage level is reached, on capacitor 21, the signal controlled rectifier 23 will be fired only occasionally, automatically maintaining the desired voltage level. Thus, once the charge on the brake capacitor 21 reaches the same potential as the instantaneous voltage level of line 25, at the time the rectifier is triggered to its conductive condition, there is essentially no conduction through the rectifier because there is no voltage drop across the rectifier. For conduction through the rectifier, its anode must be at least a few volts positive with respect to its cathode. As leakage current lowers the charge on brake capacitor 21, the voltage on the brake capacitor is reduced to a point at which there is a sufficient voltage differential between the anode and cathode of rectifier 23 to cause the rectifier to conduct. Under these circumstances, continuing conduction of the rectifier for a few cycles again builds up the charge on brake capacitor 21, following which the rectifier remains idle for an additional period. At any given time, the charge on capacitor 21 is approximately constant, the voltage differential required for conduction in rectifier 23 being quite small.

Resistor 29 and diode 31 are incorporated in the charging circuit primarily for protection of the other circuit components. Thus, resistor 29 is a relatively large resistor that limits the gate current to rectifier 23. Diode 31 prevents a reverse voltage between the gate electrode and the cathode of the signal controlled rectifier, which could damage the rectifier. In addition, resistor 24 is incorporated in the circuit primarily to limit the charging current through rectifier 23 and capacitor 21.

Initiation of the braking action is accomplished by the substantially simultaneous action of all of switches 41–44 by means of switch actuator 45. In a typical application, switches 41–44 may comprise a limit switch assembly actuated when a part of a machine tool, a conveyor, or some other apparatus reaches a point near the end of its intended travel and requires braking. In an application of this kind, switch actuator 45 may comprise a lever or other mechanical lever for physically throwing switches 41–44. On the other hand, the switch actuator may constitute a sensing element of one form or another for actuating a relay, in which case switches 41 and 42 constitute normally closed contacts of the relay and switches 43 and 44 are normally open relay contacts.

Upon operation of switch actuator 45, switch 41 opens, disconnecting brake capacitor 21 from its charging circuit. At the same time, switch 42 opens, disconnecting the normal operating circuit to the field windings of motor 11 by opening line 22. Switch 44 closes, connecting brake capacitor 21 to the common terminal 16 of field windings 14 and 15 and establishing a direct current through winding 14 as the capacitor discharges. Furthermore, switch 43 closes, so that winding 15 is connected directly in parallel with winding 14 and also receives a direct current. The direct currents through field windings 14 and 15 exert a positive braking effect on motor 11, in accordance with Lenz' law.

The energy stored in brake capacitor 21, when charged to a given voltage V determined by the setting of potentiometer 28, may be expressed as $$E = \frac{CV^2}{2}$$

Thus, it is seen that the brake energy available from capacitor 21 is directly proportional to the capacitance, which is a fixed parameter, and to the square of the voltage, which is the variable or adjustable parameter for circuit 10. Adjustment of potentiometer 26, as described above, and the corresponding adjustment of the firing angle of rectifier 23, varies the voltage to which capacitor 21 is charged. This effectively adjusts both the braking rate and the braking time for motor 11.

The circuit illustrated in FIG. 2 is a modification of FIG. 1, applied to a somewhat different motor 111. Thus, motor 111 comprises a conventional squirrel cage rotor 12 mounted upon a shaft 13 having a main winding 14 and a starting winding 15 with the two windings connected together at the common terminal 16. As before, terminal 16 is connected to the power line conductor 25. Moreover, the running winding 14 is again connected directly to the power line 22. In this instance, however, the starting winding 13 is connected to a centrifugally actuated switch 112 that is returned to conductor 22 through a starting capacitor 118.

From the foregoing description, it will be seen that motor 111 is a conventional capacitor start inductance run motor. When the motor is started, winding 15 is maintained in the operating circuit for the motor, switch 112 being closed. The centrifugal switch 112 opens when the motor approaches its rated speed, disconnecting winding 115 from the motor circuit.

In FIG. 2, brake capacitor 21 is again connected to the charging circuit, which may be the same as illustrated in FIG. 1, by the normally closed switch 41. Furthermore, the normally closed switch 42 is again incorporated in power line 22 and both of these switches are actuated by a single switch actuator 45.

In the circuit of FIG. 2, however, the connection from brake capacitor 21 to the motor windings for effecting a braking operation is somewhat different from the connection afforded by switch 44 in FIG. 1. Thus, a normally open switch 44A, in FIG. 2, connects brake capacitor 21 to the terminal of starting winding 15 opposite the terminal 16.

The operation of the circuit arrangement of FIG. 2 is essentially the same as described above in connection with FIG. 1. The principal difference is that, during a braking operation, with switches 41, 42 and 44A actuated, the two motor windings 14 and 15 are connected in series with each other across brake capacitor 21. This is in contrast with the parallel connection shown in FIG. 1. It should be noted that the series connection for the field windings illustrated in FIG. 2 can also be applied to a capacitor run motor such as the motor 11 of FIG. 1. Conversely, the parallel connection illustrated in FIG. 1 can be employed with an induction run motor such as motor 111. Moreover, either of the two brake circuits can be employed with split phase motors and other motors in which direct current braking is practically employable.

The variable dynamic direct current brake circuits of the present invention afford sensitive and accurate control for the braking rate and the braking time of alternating current motors with which they are employed. The brake circuits are relatively simple and inexpensive and adjustment of the brake rate is effected with a simple and inexpensive potentiometer. There is no requirement for variable auto-transformers or other relatively complex and expensive adjusting means. The signal controlled rectifiers that constitutes the principal control elements for the charging circuits can have relatively low current and voltage ratings. Moreover, a single circuit can be constructed to function with motors of varying sizes and ratings, merely by substituting capacitors of different size for the brake capacitor 21. Indeed, capacitors of the same rating can be employed for a substantial range of motor sizes.

In order to afford a more complete illustration of the invention, specific circuit data for the embodiment illustrated in FIG. 1 are set forth hereinafter. It should be understood that this information is provided merely by way of illustration and not as a limitation on the invention.

| Circuit component: | Rating or type |
|---|---|
| Capacitor 21, microfarads | 500 |
| Rectifier 23 | Type C106 |
| Resistor 24, ohms | 47 |
| Potentiometer 26, kilohms | 100 |
| Resistor 27, kilohms | 100 |
| Resistor 29, kilohms | 2.2 |
| Diode 31 | Type TS2 |
| Resistor 32, kilohm | 1 |
| Capacitor 33, microfarads | 0.15 |

The foregoing circuit data apply to a squirrel cage induction motor of relatively small size such as one rated at approximately 1/50 horsepower.

I claim:
1. A variable direct-current dynamic brake circuit for an alternating-current electric motor having a rotor and a field winding, said field winding connectable to an AC supply, comprising:
   a relatively large brake capacitor;
   a charging circuit connected to the AC supply for the motor and to said brake capacitor, and including a signal-controlled rectifier;
   adjustable means, included in said charging circuit, for varying the conduction angle of said signal-controlled rectifier to adjust the charge on said brake capacitor; and
   switching means for disconnecting said brake capacitor from said charging circuit, for disconnecting said field winding from said AC supply, and for substantially simultaneously connecting said brake capacitor to said field winding to discharge said brake capacitor through said field winding to brake said motor at a rate and within a time determined by the total charge on said brake capacitor.

2. A variable direct-current dynamic brake circuit for an alternating-current motor, according to claim 1, in which said adjustable means comprises a variable phase-shift circuit connected to said AC supply and to the gate electrode of said signal-controlled rectifier.

3. A variable direct-current dynamic brake circuit for an alternating current motor, according to claim 1, in which said adjustable means comprises a resistance voltage divider connected across said AC supply and including a potentiometer having a variable tap connected to the gate electrode of said signal-controlled rectifier, and a capacitor connected in parallel with said voltage divider to afford therewith a phase shift circuit, the amount of phase shift effected by said phase shift circuit being determined by adjustment of said potentiometer.

4. A variable direct-current brake circuit for an alternating-current motor, according to claim 3, and further comprising a blocking diode connected between said potentiometer tap and said gate electrode of said signal-controlled rectifier.

5. A variable direct-current dynamic brake circuit for an alternating current motor, according to claim 1, for use with an electric motor including two field windings, in which said switching means connects both of said two field windings to said brake capacitor for braking operations.

6. A variable direct-current dynamic brake circuit for an alternating current motor, according to claim 5, in which said switching means connects said field windings in parallel with each other across said brake capacitor.

7. A variable direct-current dynamic brake circuit for an alternating current motor, according to claim 6, for use with an electric motor having an operating capacitor connected to one of said field windings, in which said switching means includes means for shunting said operating capacitor during braking operations.

References Cited
UNITED STATES PATENTS 3,341,758 9/1967 Plumpe _____ 318—212
3,421,063 1/1969 Reinke _____ 318—212 XR ORIS L. RADER, Primary Examiner G. Z. RUBINSON, Assistant Examiner U.S. Cl. X.R.
318—373